April 15, 1958      L. BUSTIN      2,830,509
GRATING
Filed April 20, 1954
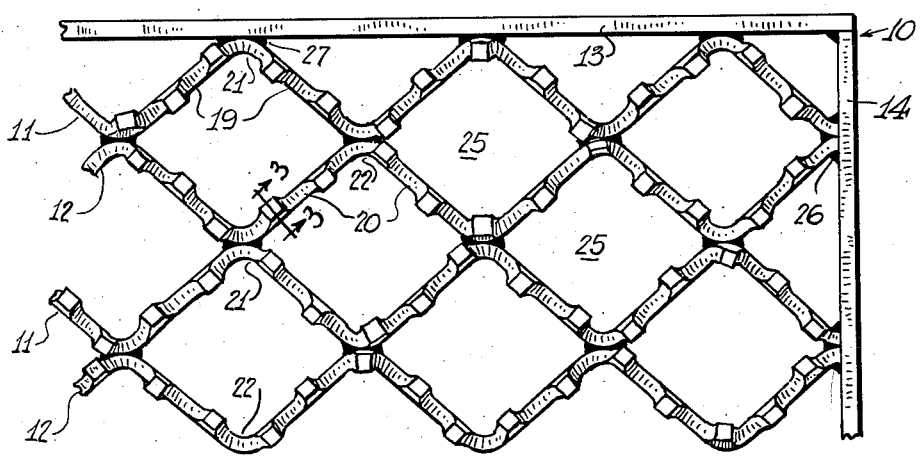
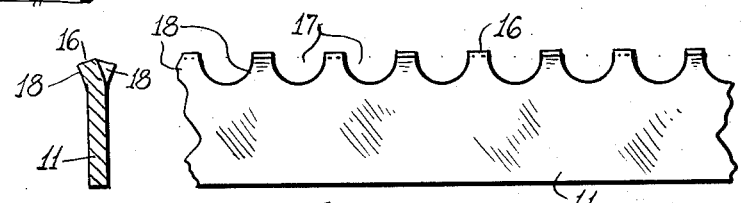
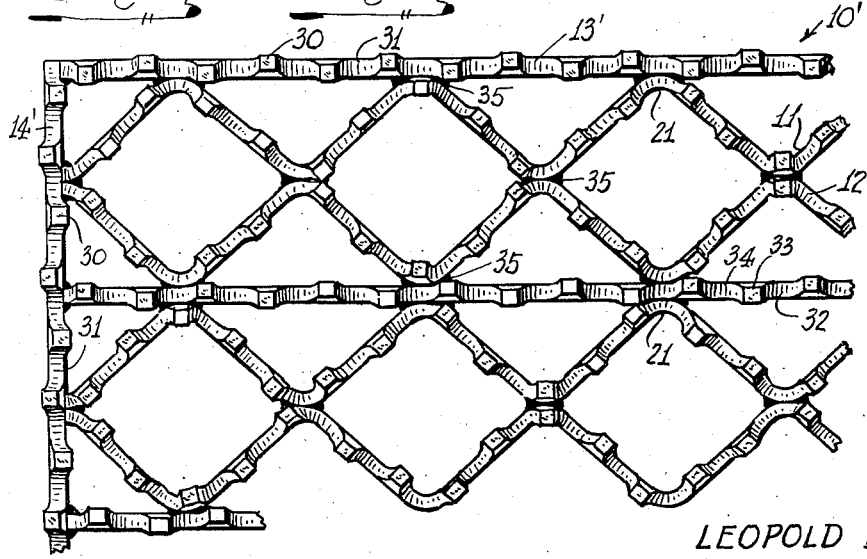
INVENTOR.
LEOPOLD BUSTIN.
BY
*Percy Freeman*
ATTORNEY.

United States Patent Office 2,830,509
Patented Apr. 15, 1958

2,830,509

GRATING

Leopold Bustin, Mamaroneck, N. Y.

Application April 20, 1954, Serial No. 424,354

1 Claim. (Cl. 94—5)

This invention relates generally to an improved grating or tread and method of making the same, and is an improvement over my co-pending patent application Serial No. 201,354, filed December 18, 1950, now Patent No. 2,668,484.

As is well known, non-skid gratings and treads are used in various industrial, military and other applications to prevent or resist skidding and slipping of workmen, vehicles and materials. In general, non-skid gratings and treads are highly desirable and employed in a wide variety of operations requiring traction under conditions of snow, sleet, grease and oil. As a few examples of applications requiring non-skid gratings or treads, there are stairs and ladders, manhole covers, truck platforms and running boards, and many others.

Heretofore, for reasons of simplicity and durability in construction, and economy in manufacture, it was necessary to produce non-skid gratings and treads having regular and uniform tread surfaces. More particularly, the advantageous employment of mass manufacturing methods required, in the past, that the resultant gratings be provided with uniform and regular tread surfaces. Obviously, such tread surfaces were not well adapted to afford maximum traction and, therefore, were found unsatisfactory under extreme conditions of use.

Accordingly, it is the principal object of the present invention to provide a highly improved non-skid grating having an irregular tread surface, and to provide a simple and efficient method of manufacturing such a grating, which method is readily adapted for mass production techniques.

It is another object of the present invention to provide a non-skid grating or tread of the type described, in which the anti-slip characteristics for both men and materials are substantially increased, and which includes a greater bearing tread surface for firm footing and safe and comfortable walking under extreme conditions of snow, sleet, grease and oil.

A more particular object of this invention is to provide a non-skid grating which includes a plurality of sinuously bent bars having projections provided thereon and fixedly secured together so as to present a highly irregular and non-uniform tread surface.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claim.

In the drawings:

Fig. 1 is a partial, top plan view showing a grating constructed in accordance with the present invention.

Fig. 2 is a fragmentary, side elevational view showing a bar in an intermediate stage of manufacturing a grating according to the method of the present invention.

Fig. 3 is a sectional view taken substantially along the line 3—3 of Fig. 1.

Fig. 4 is a partial, top plan view showing a slightly modified form of grating constructed in accordance with the present invention.

Referring now more particularly to the drawings, and specifically to Figs. 1–3 thereof, the invention illustrated therein comprises a grating, generally designated 10, having sinuously extending, elongated members or bars 11 and 12, and exterior bounding members or bars 13 and 14.

Each of the members or bars 11 and 12 is formed of straight, conventional bar stock or strip metal, such as iron or hot or cold rolled steel. Fig. 2 shows a fragment of bar 11 in an intermediate stage of manufacture, that is, before it is bent or corrugated into sinuous form. Along the upper edge 16 of the bar 11 are formed a plurality of spaced notches or cutout portions 17, as by stamping or other suitable means. The notches may be semi-circular and of identical proportions, as illustrated, or may be of other desired shape and of varying sizes and proportions. However, for speed and economy in manufacture, the equally spaced, shaped and proportioned notches have been found preferable. It will now be apparent that the bar portions 18 between the notches 17, that is, those portions remaining after the notches have been cut, provide generally upwardly extending projections on the bar 11 of equal size, shape and spacing, or otherwise, as determined by the cutout portions 17.

Alternate projections 18 are oppositely bent or angulated outwardly at an acute angle to the plane of the bar 11. In other words, one of the projections 18 is bent to extend upwardly and outwardly on one side of the bar 11, the next adjacent projection being bent to extend upwardly and outwardly on the other side of the bar, and so on, whereby every alternate projection will be tilted toward one side of the bar, and the intermediate projections will be tilted toward the other side of the bar. This may be accomplished in any desired manner, and is preferably performed after cutting of the notches 17 and before transverse bending of the bar, which will be described more fully hereinbelow.

The bars 11 and 12, after the alternate projections 18 have been oppositely bent as above described, may be bent in alternately opposite directions, as shown in Fig. 1, to assume the required zig-zag or corrugated form. More specifically, the bend lines on which the notched bars are bent extend transversely of the longitudinal axis of the bar; they are all parallel to each other and extend between the upper and lower edges of the bars. It will be noted in Fig. 1 that those portions 19 and 20 of the bars 11 and 12, respectively, which lie between the corrugations or bends 21, 21 and 22, 22 are substantially straight or flat; and, it will also be noted that the corrugations or bends are relatively sharp, defining an angle of approximately 90°. This, of course, is merely illustrative of the invention, and the notched bar 11 may be bent to form more or less acute angles to give the bars sharper or gentler curves.

While the bends 21 are preferably equally spaced apart, as are the bends 22, and while the spacing between the bends 21 and 22 are equal to each other, it is an important feature of the present invention that the positions of the bends are selected without regard to the positions of the bar edge projections. More particularly, the disposition of the alternately spaced projections 18 and notches 17 with respect to the bends 21 is determined by chance or random selection, so that there is no predetermined relationship between the projections and bends. In this manner, the projections and notches of the zig-zag shaped bars 11 and 12 will serve to provide an irregular, discontinuous tread surface. While the above described irregularity or non-uniformity of tread surface would be provided even without the diverse angularity of the bar edge projections, this has been found desirable to afford increased irregularity and non-uniformity.

In order to further increase and insure the irregularity of tread surface, it has been found preferable to space the notches 17 so that a plurality of notches, and consequently projections, preferably a mixed number, are disposed between adjacent pairs of bends. This will practically insure that the projections of each bar are irregularly arranged with respect to the bar bends; and, that the arrangement of projections with respect bends of any two bars will be different. Thus, it is now seen that although the transverse bar bends 21 are equally spaced apart from each other, and the bar edge projections 18 are also equally spaced apart from each other, the spacing between the projections is unrelated to the spacing between the bends whereby the pattern of projections at the various bends is not uniform.

In assembly of the grating 10, the zig-zag bars 11 and 12 are arranged in side by side relation, with the bends 21 and 22 mutually tangent to each other and fixedly secured together, as by welds 24 or other suitable means. It will be observed in Fig. 1 that the bars 11 and 12, thus secured together, provide a grating or tread having an open reticulated structure with somewhat diamond-shaped interstices or through openings 25. The end bounding bar 14 may be secured to the ends of the bars 11 and 12, as by welding at 26, and the side bounding bar 13 may be secured in tangential relation, by the welds 27, to the bends 21 of the bar 11.

Upon close observation, it will be noted that the bar portions 19 and 20 are only in substantial alignment, and do not form a continuous straight line, such as would detract from the desired irregularity of tread surface, by reason of the bent portions 21 and 22. Of course, the oppositely angulated projections on the bar portions 19 and 20 serve to further remove the bar portions from the formation of a straight line. In practice, it has been found preferable to limit the interstices to a size not exceeding 1⅛ inches square, so that the opening will be less than ⅓ the heel area of a man's shoe. Further, the maximum safe length of straight bar portion has been found to be ⅞ inches, and the maximum satisfactory notch size has been found to be ⅜ inch diameter on ⅞ inch centers, leaving ½ inch projections to provide the tread bearing surface.

In Fig. 4 is shown a slightly modified form of grating 10′, wherein the transverse or end bounding bar 14′ and the side bounding bar 13′ are each formed with alternately spaced projections and notches 30 and 31, and wherein the projections are bent or angulated in alternately opposite directions, as described hereinbefore. Further, the bounding bar projections are arranged at random with respect to the bends and projections of the bars 11 and 12. In this manner, the bounding bars are advantageously employed to enlarge the tread surface area and increase the irregularity and nonuniformity of the surface.

Where a grating of exceptional rigidity and strength is required, it has been found desirable to employ bearing bars, such as at 32, which extend longitudinally of and between adjacent pairs of zig-zag bars 11 and 12. More particularly, the bearing bars 32 and bounding bars 13′ and 14′ are substantially identical to the bars 11 and 12 before transverse bending of the latter. That is, the bearing bars 32 include alternately spaced projections and notches 33 and 34, the projections being bent or angulated in opposite directions at an acute angle to the plane of the bar, and are disposed along side of or between the zig-zag bars tangent to the bends thereof and fixedly secured thereto, as by welds 35. By this means, the grating length may be substantially increased without increasing the bar thickness; and, the bearing bar, having its projections 33 arranged at random with respect to the bends and projections of the zig-zag bars 11 and 12, serves to increase the irregularity of the tread surface, in substantially the same manner as the bounding bars 13′ and 14′.

The foregoing is illustrative of the basic principles of the invention, and it will be understood that modifications and changes may be incorporated in the illustrated forms of the invention without departing from its basic principles.

Having thus described my invention, what I claim as new and desire to secure by Letters Patent, is:

A grating comprising a plurality of bars, each of said bars being reversely bent at regular spaced intervals, with the apices of the bends of adjacent bars welded to each other to form an open reticulated structure, the upper edge of each of said bars being provided with closely spaced projections, alternate projections being oppositely bent at an acute angle to the plane of the bar, the spacing between said projections being unrelated to the spacing between the bends whereby the pattern of projections at the various weld points is not uniform.

References Cited in the file of this patent

UNITED STATES PATENTS

| | | |
|---|---|---|
| 684,383 | Ross | Oct. 8, 1901 |
| 2,208,020 | Delanty | July 16, 1940 |
| 2,305,016 | Leppla | Dec. 15, 1942 |
| 2,656,903 | Kerrigan | Oct. 27, 1953 |
| 2,660,102 | Tarof | Nov. 24, 1953 |
| 2,668,484 | Bustin | Feb. 9, 1954 |
| 2,760,416 | Bates | Aug. 28, 1956 |